No. 723,446.
PATENTED MAR. 24, 1903.
R. F. DULL.
MOTH TRAP.
APPLICATION FILED APR. 8, 1902.
NO MODEL.
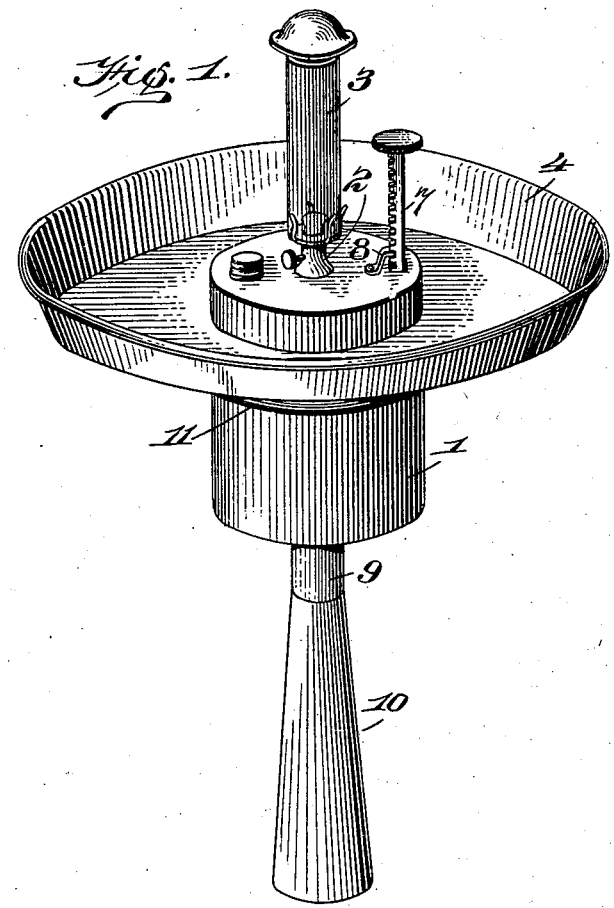
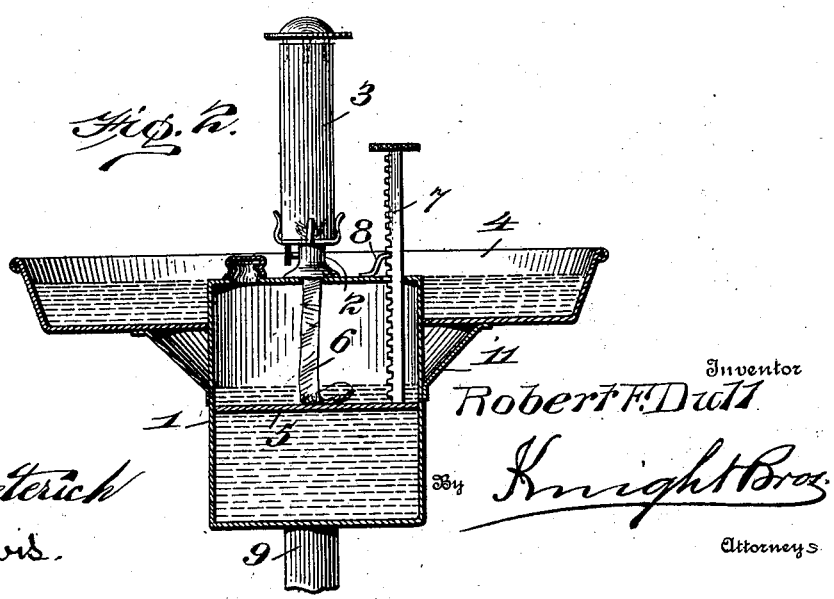

UNITED STATES PATENT OFFICE.

ROBERT F. DULL, OF BRIDGEWATER, VIRGINIA.

MOTH-TRAP.

SPECIFICATION forming part of Letters Patent No. 723,446, dated March 24, 1903.

Application filed April 8, 1902. Serial No. 101,932. (No model.)

*To all whom it may concern:*

Be it known that I, ROBERT F. DULL, a citizen of the United States, and a resident of Bridgewater, in the county of Rockingham and State of Virginia, have invented certain new and useful Improvements in Moth-Traps, of which the following is a specification.

My invention relates to insect-destroyers for catching flying insects or moths, which embody a suitable source of illumination for attracting the insects at night and a pan or receptacle containing a fluid in which the insects are entrapped. It is customary to erect insect-destroyers of this type in an orchard or other location where the moth flies and deposits its eggs during the night-time and to burn the illuminant during a portion of the night and then to extinguish it; but so long as the illuminant is burning brightly it attracts the insects from afar and even draws into the locality a large number of insects from distant points which would otherwise not be present in the place which it is desired to protect. Then when the light is suddenly extinguished the effect is worse than if the exterminator had not been in operation, owing to the large number of insects that have been attracted to the locality without being caught. It is also desirable to avoid the necessity of tending the exterminator to extinguish it at certain hours of the night—as, for instance, at moonrise, after which time the device is useless.

The object of my invention is to provide means whereby the area of the attractive influence of the insect-destroyer may be gradually diminished, so that the device will discontinue to draw from distant points, but will continue its attractive influence in its immediate vicinity a sufficient time to gather in and destroy all of the insects that have been attracted to it.

A further object is to accomplish final extinguishment of the illuminant at a predetermined time, and thus save the waste of illuminant without the necessity of attendance upon the device after it is once set. While a number of different devices might be employed for gradually diminishing the flame of the illuminant up to the point of final extinguishment, I prefer to employ a means that will operate on the principle of gradually diminishing and finally cutting off the supply of illuminant.

My invention consists in certain means whereby the above-mentioned objects are attained and also in certain novel features of construction, all of which will be fully understood upon reference to the accompanying drawings, in which—

Figure 1 is a perspective view of a moth-trap embodying the principles of my invention, and Fig. 2 is a central vertical section of the same.

1 represents a reservoir for illuminating-oil, provided with a burner 2, which may be equipped with a chimney 3. This chimney is designed to withstand exposure to the weather, for which purpose it is constructed of mica and provided with a protecting-cap.

4 represents a pan or receptacle mounted upon the reservoir 1 in such a manner that it will be fluid-tight and hold a suitable quantity of fluid to have the effect of destroying insects dropping into it—such, for instance, as kerosene. When the burner is lighted and insects are attracted, they fly into the fluid or, striking against the chimney 3, drop into the receptacle and are immediately destroyed.

In order to provide for gradually cutting off the supply of illuminant, I provide a false bottom 5 in the reservoir, which supports the wick 6, so that the latter can absorb only so much of the illuminant as is above the false bottom. The false bottom may be adjusted to any height in the reservoir by means of a supporting-rod 7, working through the top of the reservoir and held to any adjustment by means of a dog 8, engaging in teeth in the rod. Thus when the reservoir is filled the rod is adjusted so as to bring the false bottom, with the wick which it supports, to a point beyond which the illuminant will recede as it is consumed during the desired number of hours burning. As the illuminant above the false bottom gets low the wick will absorb it less rapidly and the light will grow dimmer. The light grows progressively dimmer as the illuminant above the false bottom is consumed until final extinguishment takes place. By this effect the area of influence of the light is gradually reduced, so that it ceases to draw insects from a distance, but will still attract those that are in the vicinity, and thus gather in all that have been brought within the area to be protected instead of leaving free a large number of destructive insects that have been attracted and which might otherwise have remained outside of the area.

The device is provided with a socket 9, that adapts it to be mounted upon a supporting-post 10. The pan or receptacle 4 is supported upon the reservoir 1 by a flaring supporting-flange 11. In the construction illustrated this flange is permanently soldered to the exterior wall of the reservoir and to the bottom of the pan. The inner perimeter of the pan is also soldered to the reservoir and a rigid structure of the whole thus secured.

Having thus described my invention, the following is what I claim as new therein and desire to secure by Letters Patent:

In an insect-destroyer, the combination of a reservoir, a lamp supplied by said reservoir, a pan or receptacle surrounding said reservoir, and the upwardly and outwardly flaring flange 11 also surrounding the reservoir and secured to said reservoir and to the bottom of the pan or receptacle, for the purpose set forth.

The foregoing specification signed this 8th day of April, 1902.

ROBERT F. DULL.

In presence of—
HERVEY S. KNIGHT,
HUGH M. STERLING.